US012764095B2

(12) United States Patent
Johnson et al.

(10) Patent No.: US 12,764,095 B2
(45) Date of Patent: Oct. 13, 2026

(54) INTERFACE FOR SECURE CLOUD METADATA RETRIEVAL

(71) Applicant: Capital One Services, LLC, McLean, VA (US)

(72) Inventors: Stephen Johnson, Purcellville, VA (US); Chris Mullins, Colorado Springs, CO (US); Kyle Busekist, Baton Rouge, LA (US)

(73) Assignee: Capital One Services, LLC, McLean, VA (US)

( * ) Notice: Subject to any disclaimer, the term of this patent is extended or adjusted under 35 U.S.C. 154(b) by 66 days.

(21) Appl. No.: 19/034,168

(22) Filed: Jan. 22, 2025

(65) Prior Publication Data

US 2026/0214074 A1 Jul. 23, 2026

(51) Int. Cl.
*H04L 9/40* (2022.01)

(52) U.S. Cl.
CPC ...... *H04L 63/0236* (2013.01); *H04L 63/0281* (2013.01); *H04L 63/083* (2013.01)

(58) Field of Classification Search
CPC ....................... H04L 63/0236; H04L 63/0281; H04L 63/083
See application file for complete search history.

(56) References Cited

U.S. PATENT DOCUMENTS 8,892,766 B1 * 11/2014 Wei ......................... H04L 63/20 706/26
2016/0269467 A1 * 9/2016 Lee ..................... H04L 61/5007
2019/0014143 A1 * 1/2019 Syme .................. H04L 63/1441
2019/0089748 A1 * 3/2019 Manor .................. H04L 63/205
2020/0175494 A1 * 6/2020 DeSoto ................. H04W 12/06
2024/0323014 A1 * 9/2024 Golic ..................... H04W 12/80
2025/0247375 A1 * 7/2025 Hansén ............... H04L 47/2475

OTHER PUBLICATIONS

Wang et al., "A secured metadata and data separation model for cloud storage," 2013 IEEE International Conference on Signal Processing, Communication and Computing (ICSPCC 2013), KunMing, China, pp. 1-6 (Year: 2013).*
"GitHub—Netflix-Skunkworks/aws-metadata-proxy: AWS Metadata Proxy for protection against SSRF," https://github.com/Netflix-Skunkworks/aws-metadata-proxy; 2 pages.

* cited by examiner

*Primary Examiner* — Morshed Mehedi
(74) *Attorney, Agent, or Firm* — Harrity & Harrity, LLP

(57) ABSTRACT

In some implementations, an application server may establish a proxy service component associated with a metadata source associated with a first version of a metadata service and having a first type of metadata requests. The application server may configure a packet filtering component. The application server may receive a first metadata request. The application server may determine that the first metadata request is associated with the second type of the second version of the metadata service. The application server may authorize the first metadata request. The application server may generate a second metadata request associated with the first type of the first version of the metadata service. The application server may transmit the second metadata request. The application server may receive a metadata response. The application server may transmit information identifying a content of the metadata response.

20 Claims, 6 Drawing Sheets

INTERFACE FOR SECURE CLOUD METADATA RETRIEVAL

BACKGROUND

An instance metadata service (IMDS) may provide information associated with an instance running on a computer system. For example, the IMDS may provide information identifying a set of virtual machines (VMs), a set of virtual network interface cards (VNICs), a set of virtual volumes, a resource utilization, or another type of metadata associated with a computer system. A cloud computing environment may provide a metadata endpoint, such as an IMDS endpoint, to provide secure exposure of information associated with the cloud computing environment to one or more client devices. For example, a service provider may use a client device to determine a status of a cloud computing environment. In this case, the client device may request and receive metadata about the cloud computing environment from the metadata endpoint to generate status information.

SUMMARY

Some implementations described herein relate to a system for secure cloud metadata retrieval. The system may include one or more memories and one or more processors communicatively coupled to the one or more memories. The one or more processors may be configured to establish, on an application server, a proxy service associated with a proxy user. The one or more processors may be configured to configure, on the application server, a packet filter rule associated with redirection of metadata service traffic, associated with a metadata service, originating from a source other than the proxy service. The one or more processors may be configured to receive, at the application server, a metadata request for metadata from the metadata service, wherein the metadata request is associated with a set of attribute values and a uniform resource identifier (URI). The one or more processors may be configured to evaluate, via the proxy service, the set of attribute values and the URI of the metadata request to determine whether to authorize the metadata request. The one or more processors may be configured to extract, from the metadata request, request information associated with identifying the metadata that is responsive to the metadata request. The one or more processors may be configured to obtain, from the metadata service and using a set of credentials associated with the proxy service, the metadata that is responsive to the metadata request. The one or more processors may be configured to transmit a metadata response message conveying the metadata that is responsive to the metadata request.

Some implementations described herein relate to a method for metadata interfacing. The method may include establishing, by an application server, a proxy service component associated with a metadata source associated with a first version of a metadata service and having a first type of metadata requests. The method may include configuring, by the application server, a packet filtering component associated with redirection of metadata service traffic directed to the metadata service associated with a second type of a second version of the metadata service. The method may include receiving, by the application server and from a request source, a first metadata request directed to an endpoint associated with the first version of the metadata service. The method may include determining, by the application server and using the packet filtering component, that the first metadata request is associated with the second type of the second version of the metadata service. The method may include passing, by the application server, the first metadata request from the packet filtering component to the proxy service component. The method may include authorizing, by the application server, the first metadata request for fulfillment by the proxy service component. The method may include generating, by the application server and using the proxy service component, a second metadata request associated with the first type of the first version of the metadata service based on authorizing the first metadata request for fulfillment. The method may include transmitting, by the application server, the second metadata request to the metadata service. The method may include receiving, by the application server, a metadata response as a response to the second metadata request. The method may include transmitting, by the application server, information identifying a content of the metadata response to the request source as a response to the first metadata request.

Some implementations described herein relate to a non-transitory computer-readable medium that stores a set of instructions. The set of instructions, when executed by one or more processors of a system, may cause the system to establish a proxy service associated with a proxy user. The set of instructions, when executed by one or more processors of the system, may cause the system to configure a packet filter rule associated with redirection of metadata service traffic, associated with a metadata service, originating from a source other than the proxy service. The set of instructions, when executed by one or more processors of the system, may cause the system to receive a metadata request for metadata from the metadata service. The set of instructions, when executed by one or more processors of the system, may cause the system to evaluate the metadata request to determine whether to authorize the metadata request. The set of instructions, when executed by one or more processors of the system, may cause the system to extract request information associated with identifying the metadata that is responsive to the metadata request based on authorizing the metadata request. The set of instructions, when executed by one or more processors of the system, may cause the system to obtain the metadata that is responsive to the metadata request. The set of instructions, when executed by one or more processors of the system, may cause the system to transmit a metadata response message conveying the metadata that is responsive to the metadata request.

DETAILED DESCRIPTION

Figure 1A:
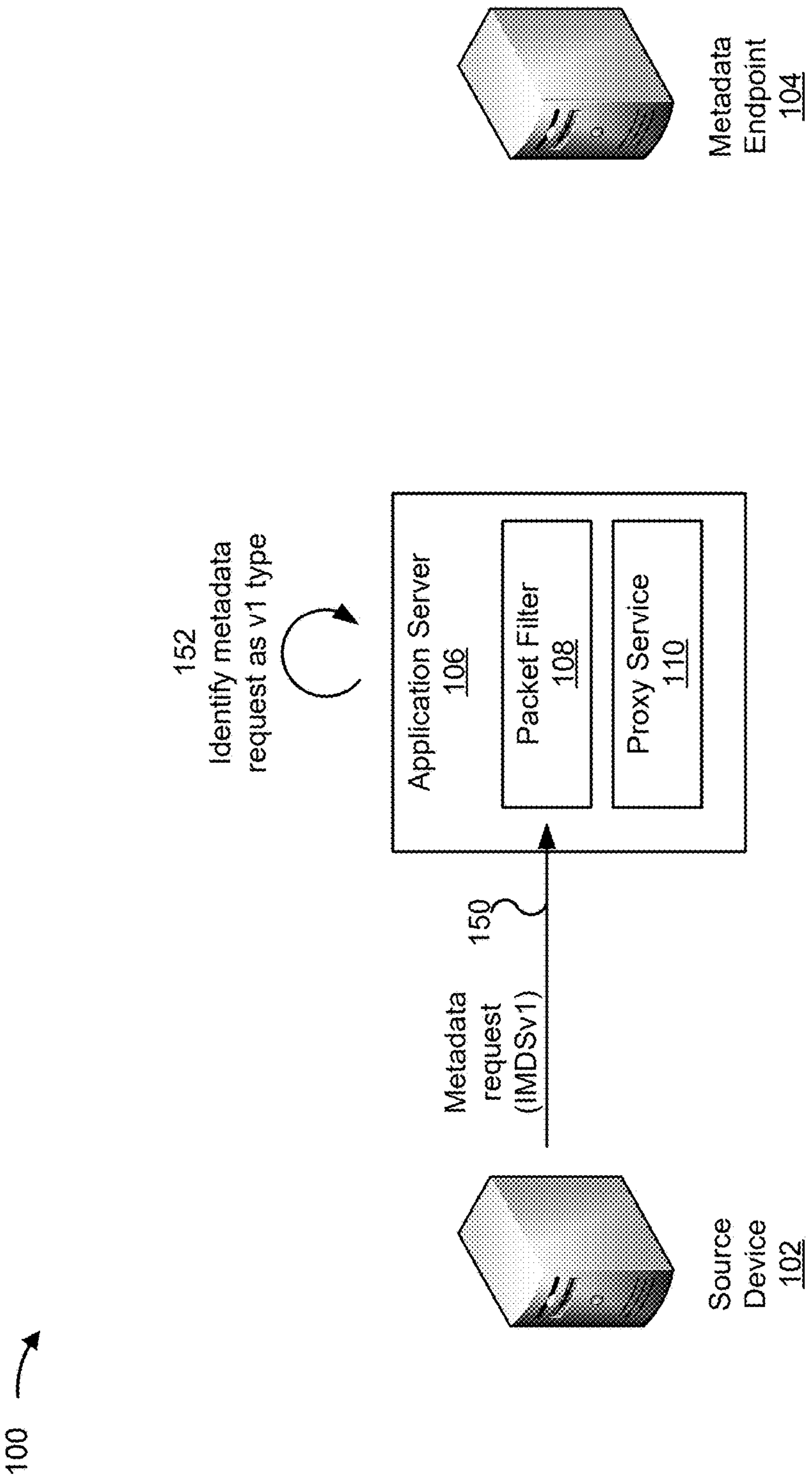
FIGS. 1A-1C are diagrams of an example implementation associated with providing an interface for secure cloud metadata retrieval, in accordance with some embodiments of the present disclosure.

The following detailed description of example implementations refers to the accompanying drawings. The same reference numbers in different drawings may identify the same or similar elements.

Some computing systems may provide authentication to ensure that secure information is not disseminated to unauthorized users or systems. For example, when an application requests server metadata from a metadata endpoint, the metadata endpoint may authenticate the application to ensure that the application is authorized to receive the server metadata. Server metadata may include instance information (e.g., an instance identifier, a type launch time, a public network address, or a private network address), networking information (e.g., a virtual private cloud identifier, a subnet identifier, a security group identifier, or a network address identifier), location information (e.g., a region identifier or an availability zone identifier), authentication information (e.g., identity and access management (IAM) role information, such as an IAM role name or a set of security credentials or access keys), user data, categorization tags, or version information. Some server metadata may provide secure access to a computing system, such as a set of security credentials or access keys. Accordingly, providing server metadata to an unauthorized application can result in a security risk to a system.

In some cases, a type of a metadata request may not match a type that a metadata endpoint is configured to receive. For example, a metadata endpoint may be configured for instance metadata service (IMDS) version 2 (IMDSv2), but an application that is requesting metadata may be configured to transmit metadata requests in a format associated with IMDS version 1 (IMDSv1). One example of a scenario in which an application may be associated with a metadata request type that does not match a metadata endpoint is a scenario in which an entity controlling the metadata endpoint does not control the application. For example, a first entity may establish an IMDSv2 endpoint to provide a higher level of security than IMDSv1 endpoints, but a second entity may control an application that is to access the IMDSv2 endpoint and may fail to update the application from IMDSv1 to IMDSv2. Another example scenario is when an application platform is out of date, and updating the application to a different version of metadata request may not be feasible. This may occur with some open source applications. Another example scenario is when a deployment environment for an application does not support configuration for a different version of metadata request. For example, a deployment environment of an application may support a first one or more message exchanges for a first type of metadata request, but not a second one or more message exchanges for a second type of metadata request.

In such scenarios, among other examples, applications may fail to access server metadata, which may prevent the applications from performing one or more tasks, such as obtaining security credentials to access a server. This may result in application failures, which may result in errors in application functionality. Alternatively, some entities, to avoid application failures, may not update a metadata endpoint to a new metadata request version. For example, an entity may avoid updating a metadata endpoint from IMDSv1 to IMDSv2 to avoid a negative impact to functionality of one or more applications that use the metadata endpoint. However, avoiding a system upgrade may result in using an older version of a metadata request, which may be associated with less efficient operation (e.g., greater utilization of processor, memory, or network resources) or less secure operation (e.g., less secure authentication of metadata requests).

Some implementations described herein provide for secure cloud metadata retrieval. For example, some implementations described herein may provide a system that interfaces with applications to provide secure cloud or server metadata retrieval when an application transmits a metadata request of a first type and a metadata endpoint is configured to receive metadata requests of a second type. In this example, some implementations described herein may perform an authentication procedure on the first type of metadata request, determine that the first type of metadata request is authenticated, and retrieve requested metadata using a second type of metadata request. In this way, an entity can use the second type of metadata request to provide improved security and/or improved resource efficiency, but may maintain compatibility with applications that use the first type of metadata request.

Figure 1B:
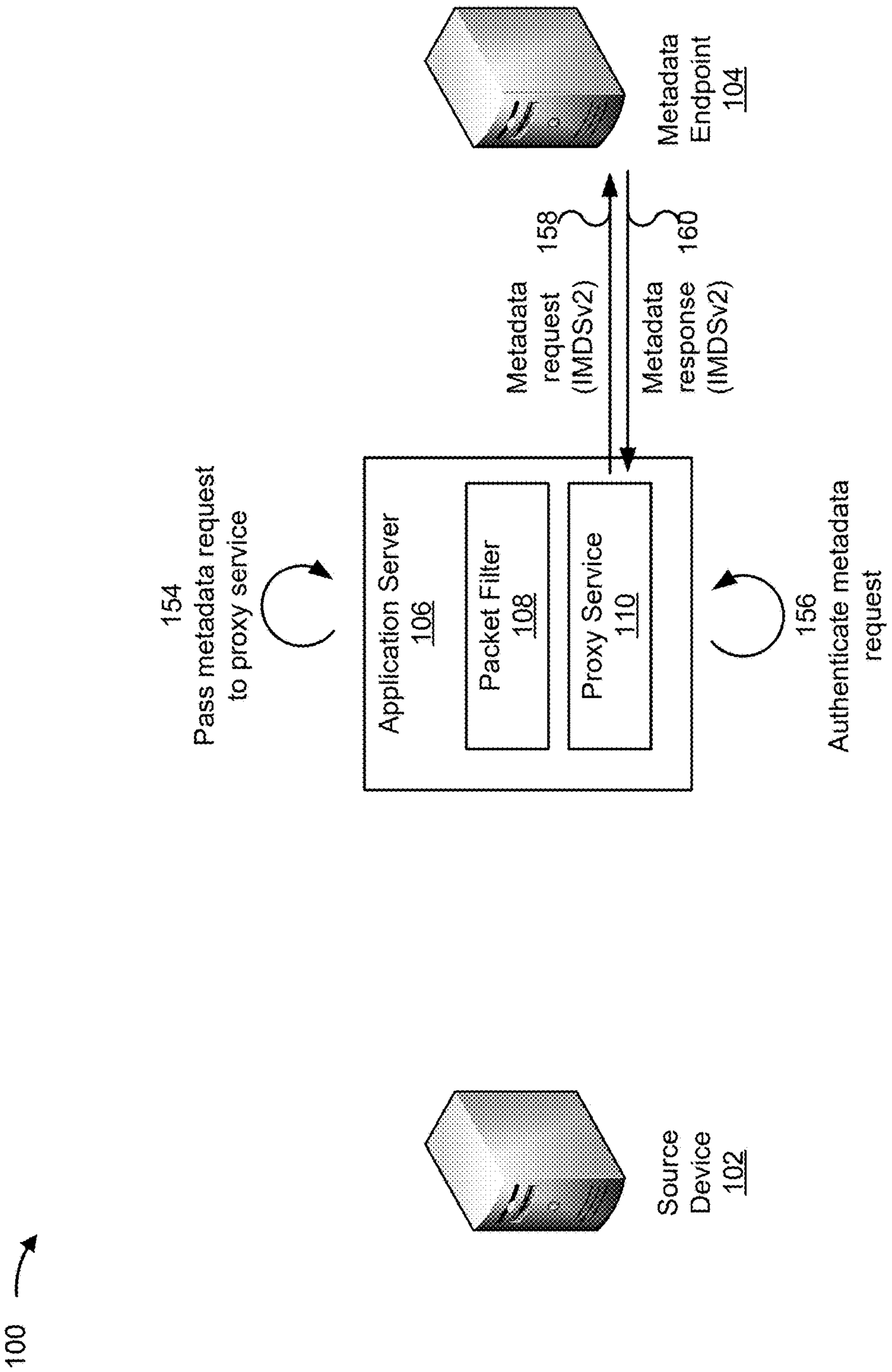
Figure 1C:
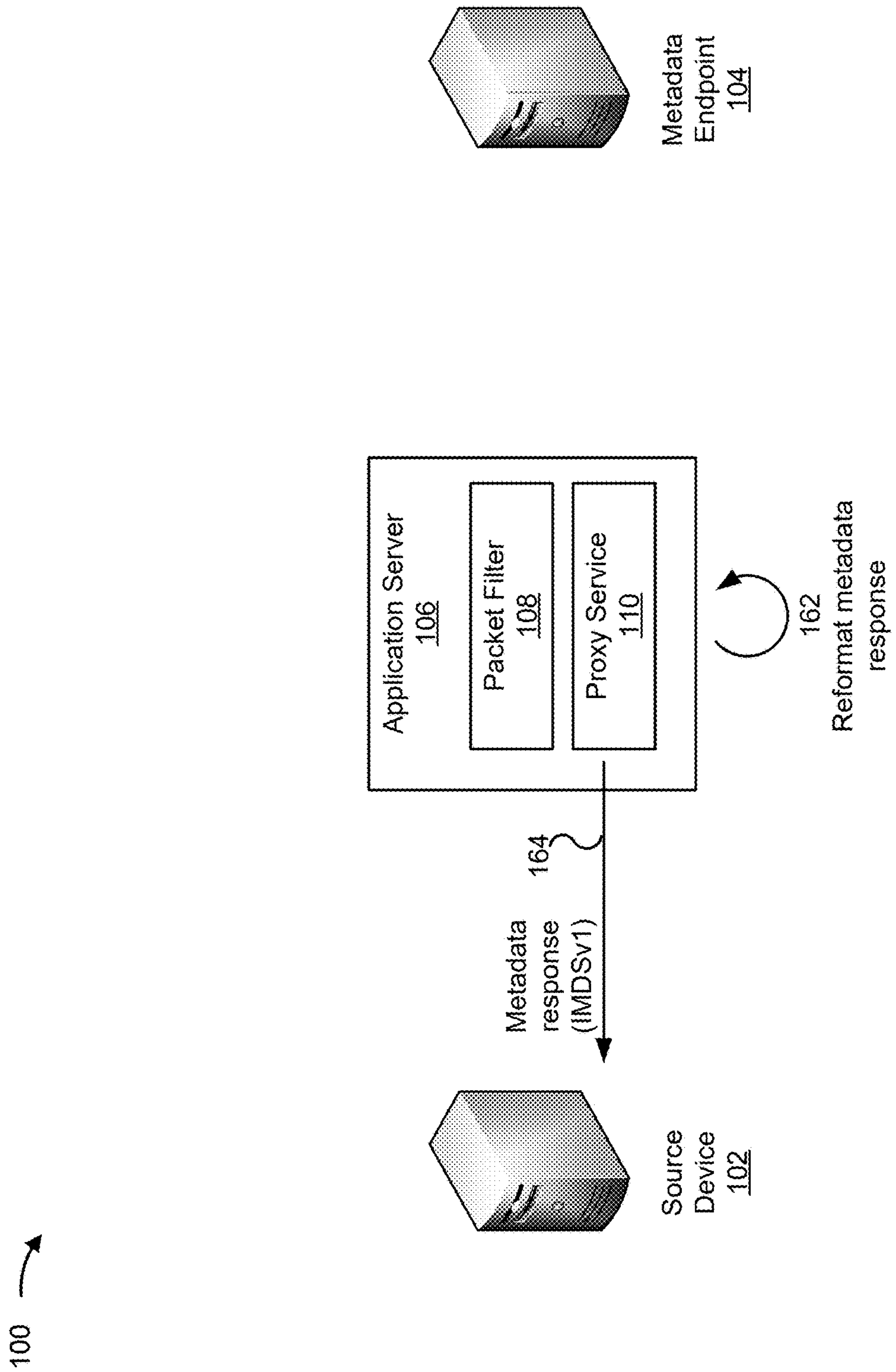

FIGS. 1A-1C are diagrams of an example implementation 100 associated with providing an interface for secure cloud metadata retrieval. As shown in FIGS. 1A-1C, example implementation 100 includes a source device 102, a metadata endpoint 104, and an application server 106. These devices are described in more detail below in connection with FIG. 2 and FIG. 3.

In some implementations, the application server 106 may establish, configure, and/or install one or more components for fulfilling metadata requests. For example, the application server 106 may establish a packet filter 108. In this case, the application server 106 may install the packet filter 108 onto the application server 106 and may configure the packet filter 108 to identify packets associated with metadata requests directed to the metadata endpoint 104. For example, the application server 106 may generate, store, and/or propagate an Internet Protocol (IP) table (IPTable) packet filter rule to redirect metadata service traffic (e.g., not originating from the application server 106 and a proxy service 110 thereof) to the proxy service 110. In other words, the application server 106 may cause metadata service traffic to be redirected to the application server 106 rather than to the metadata endpoint 104. Additionally, or alternatively, the application server 106 may establish the proxy service 110. For example, the application server 106 may instantiate the proxy service 110 (e.g., as an interface between the source device 102 and the metadata endpoint 104) and allocate resources for the proxy service 110. In this case, the application server 106 may configure one or more authentication procedures for the proxy service 110, as described in more detail herein.

As further shown in FIG. 1A, and by reference number 150, the application server 106 may receive a metadata request. For example, the application server 106 may receive, from the source device 102, an IMDSv1 type of metadata request directed to the metadata endpoint 104. In this case, the application server 106 and/or one or more networking devices associated therewith may redirect the metadata request from a destination of the metadata request (e.g., the metadata endpoint 104) to the application server 106. In some implementations, the application server 106 may receive the metadata request based on the metadata request being transmitted toward the metadata endpoint 104. For example, the source device 102 may transmit the metadata request via one or more network devices associated with the application server 106.

As further shown in FIG. 1A, and by reference number 152, the application server 106 may identify the metadata request as being of a first type. For example, the application server 106 may determine that the metadata request is an IMDSv1 type of metadata request. In some implementations, the application server 106 may determine that the metadata request is metadata traffic. For example, the application server 106 may perform an inspection of a message to determine that the message includes the metadata request. In this case, the inspection of the message may include analyzing one or more packets or packet headers, performing a deep packet inspection, or analyzing a source IP address or destination IP address, among other examples. In some implementations, the application server 106 may determine a type of the metadata request. For example, the application server 106 may determine that the metadata request is an IMDSv1 type of metadata request (e.g., that does not match the IMDSv2 type of metadata request for which the metadata endpoint 104 is configured), and may determine to pass the IMDSv1 type of metadata request to the proxy service 110 for proxy fulfillment. In this case, when the application server 106 determines that a metadata request is an IMDSv2 type of metadata request (e.g., that does match the type of metadata request for which the metadata endpoint 104 is configured), the application server 106 may pass the IMDSv2 type of metadata request onward to the metadata endpoint 104 without proxy fulfillment. For example, the application server 106 may determine that the metadata request includes a metadata authentication token (e.g., which may be associated with IMDSv2) and may transparently forward the metadata request to the metadata endpoint 104 without further authentication or format translation. Alternatively, when the metadata request does not include a metadata authentication token, the application server 106 may perform further validation, such as by identifying a user agent (e.g., the source device 102) and a metadata endpoint 104, validating the user agent and an associated credential request for access to the metadata endpoint 104, requesting an authentication token from the metadata endpoint 104, and forwarding the metadata request using the authentication token, as described herein.

As shown in FIG. 1B, and by reference number 154, the application server 106 may pass the metadata request to the proxy service 110. For example, the application server 106 may pass the IMDSv1 metadata request from the packet filter 108 to the proxy service 110. In this case, the application server 106 may use a redirection rule to pass the metadata request to the proxy service 110. For example, based on generating an IPTable rule, the application server 106 may redirect metadata traffic, such as metadata traffic that includes an IMDSv1 metadata request, to the proxy service 110 for proxy fulfillment.

As further shown in FIG. 1B, and by reference number 156, the application server 106 may authenticate the metadata request for completion. For example, the application server 106 may use the proxy service 110 to perform one or more authentication steps to determine whether to permit the metadata request to be completed. In some implementations, the application server 106 may evaluate one or more attributes to determine whether to authenticate the metadata request. For example, the application server 106 may analyze one or more hypertext transfer protocol (HTTP) attributes (e.g., packet header attributes, such as source or destination IP, packet size attributes, or packet content attributes) of the metadata request. Additionally, or alternatively, the application server 106 may analyze a uniform resource identifier (URI) or uniform resource locator (URL) associated with the metadata request. Additionally, or alternatively, the application server 106 may identify one or more other attributes, such as a metadata string attribute, a time attribute, a user identity attribute, a request source attribute, or an endpoint attribute, among other examples.

In some implementations, the application server 106 may determine whether one or more parameters matches an expected parameter. For example, the application server 106 may determine whether one or more HTTP attributes match an expected HTTP attribute for a metadata request from a trusted source (e.g., a trusted application). Additionally, or alternatively, the application server 106 may determine whether a credential request is included in the metadata request. For example, when there is a presence of a credential request in the metadata request, the application server 106 may determine to authenticate the metadata request in connection with parameters of the metadata request. In this case, the application server 106 may determine whether the metadata request is associated with a valid user agent (e.g., a valid source device 102) and may authenticate the metadata request for the valid user agent.

Additionally, or alternatively, the application server 106 may determine whether a set of analyzed parameters satisfies a threshold level of security for authentication. For example, the application server 106 may determine whether a combination of the HTTP attributes and the URI is sufficient information for authorizing access to server or cloud metadata. In this case, the application server 106 may use a threat assessment model to score one or more analyzed attributes and determine whether the score satisfies a threshold for authentication (e.g., less than a threshold likelihood that a metadata request is from a malicious source).

In some implementations, the application server 106 may identify a security level of the metadata endpoint 104 in connection with using a threat assessment model. For example, the application server 106 may determine a level of authentication that is to be performed on the metadata request based on a type of metadata endpoint 104 to which the metadata request is being directed. In this case, different metadata endpoints 104 may have different security levels based on a type of information that can be provided from the different metadata endpoints 104, a type of compliance rule to which the different metadata endpoints 104 are subject, or another factor. Additionally, or alternatively, the application server 106 may identify a security level of the metadata request. For example, metadata requests that are not credential fetching requests may be a relatively low security risk, but credential fetching requests may be relatively high security risks. In this case, the application server 106 may determine a level of authentication to perform based on a level of security risk of the metadata request.

In some implementations, the application server 106 may generate the threat assessment model based on a set of records of IMDSv1 metadata requests. For example, the application server 106 may store information on a set of IMDSv1 metadata requests or other IMDSv1 calls, and may use the information to train a model for authenticating subsequent IMDSv1 metadata requests. One or more parameters that may be included in training a threat assessment model may include a parameter identifying a set of times of a set of requests, a set of users associated with a set of requests, a set of HTTP user agents associated with a set of requests, a set of binaries generating the set of requests, or another parameter. In some implementations, the application server 106 may classify IMDSv1 metadata requests to authenticate the IMDSv1 metadata requests. For example, the application server 106 may classify an IMDSv1 metadata request into a particular class or cluster using the threat assessment model. The particular class or cluster may relate to an attribute of the IMDSv1 metadata request or a threat level associated with the IMDSv1 metadata request, among other examples. For example, the application server 106 may classify the IMDSv1 metadata request into a low risk class (e.g., that may be automatically authenticated), a high risk class (e.g., that may be automatically rejected), or a medium risk class (e.g., that may have additional authentication steps before authentication or rejection). In some implementations, the application server 106 may implement a threat assessment model as a rule set, an authorization logic, a machine learning or artificial intelligence model, a decision tree, or another type of model implementation.

When the application server 106 fails to authenticate the metadata request, the application server 106 may return an authorization error to the source device 102 and/or request additional authentication information from the source device 102. For example, based on analyzing the IMDSv1 type of metadata request, the application server 106 may determine to perform one or more additional authorization tests before authenticating the IMDSv1 type of metadata request. The additional authorization tests may include requests for additional credentials, two-factor authentication, elevating the IMDSv1 type of metadata request for approval by another approval authority, or another type of additional authorization test.

As further shown in FIG. 1B, and by reference numbers 158 and 160, the application server 106 may transmit a metadata request and receive a metadata response. For example, based on authenticating the IMDSv1 type of metadata request received from the source device 102, the application server 106 may transmit an IMDSv2 type of metadata request to the metadata endpoint 104 and may receive an IMDSv2 type of metadata response from the metadata endpoint 104. In some implementations, the application server 106 may obtain an authentication token for the IMDSv2 type of metadata response. For example, based on authenticating the IMDSv1 type of metadata request, the application server 106 may request and receive an authentication token. In this case, the application server 106 may include the authentication toke in an IMDSv2 type of metadata request provided to the metadata endpoint 104.

In some implementations, the application server 106 may use the proxy service 110 to extract information from the IMDSv1 type of metadata request to generate the IMDSv2 type of metadata request. For example, the application server 106 may extract information identifying a type of server or cloud metadata being requested and may generate an IMDSv2 format metadata request that includes the information identifying the type of server or cloud metadata being requested. Additionally, or alternatively, the application server 106 may extract identification information from the IMDSv1 type of metadata request to include in the IMDSv2 type of metadata request to enable identification of an IMDSv2 type of metadata response (and direction of the IMDSv2 type of metadata response to the source device 102). In this case, when the application server 106 receives the IMDSv2 type of metadata response from the metadata endpoint 104, the application server 106 may use included identification information to determine that the IMDSv2 type of metadata response is fulfillment of the received IMDSv1 type of metadata request and the subsequently generated IMDSv2 type of metadata request.

As shown in FIG. 1C, and by reference number 162, the application server 106 may reformat the metadata response to a message format associated with a source of the metadata request. For example, based on receiving the metadata response to the IMDSv2 type of metadata request, the application server 106 may generate an IMDSv1 type of metadata response to transmit to the source device 102. In other words, the application server 106 may reformat the received IMDSv2 type of metadata response, such that the source device 102 is provided with an IMDSv1 type of metadata response to the original IMDSv1 type of metadata request.

As further shown in FIG. 1C, and by reference number 164, the application server 106 may transmit a metadata response to the source device 102. For example, the application server 106 may transmit an IMDSv1 type of metadata response to the source device 102.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
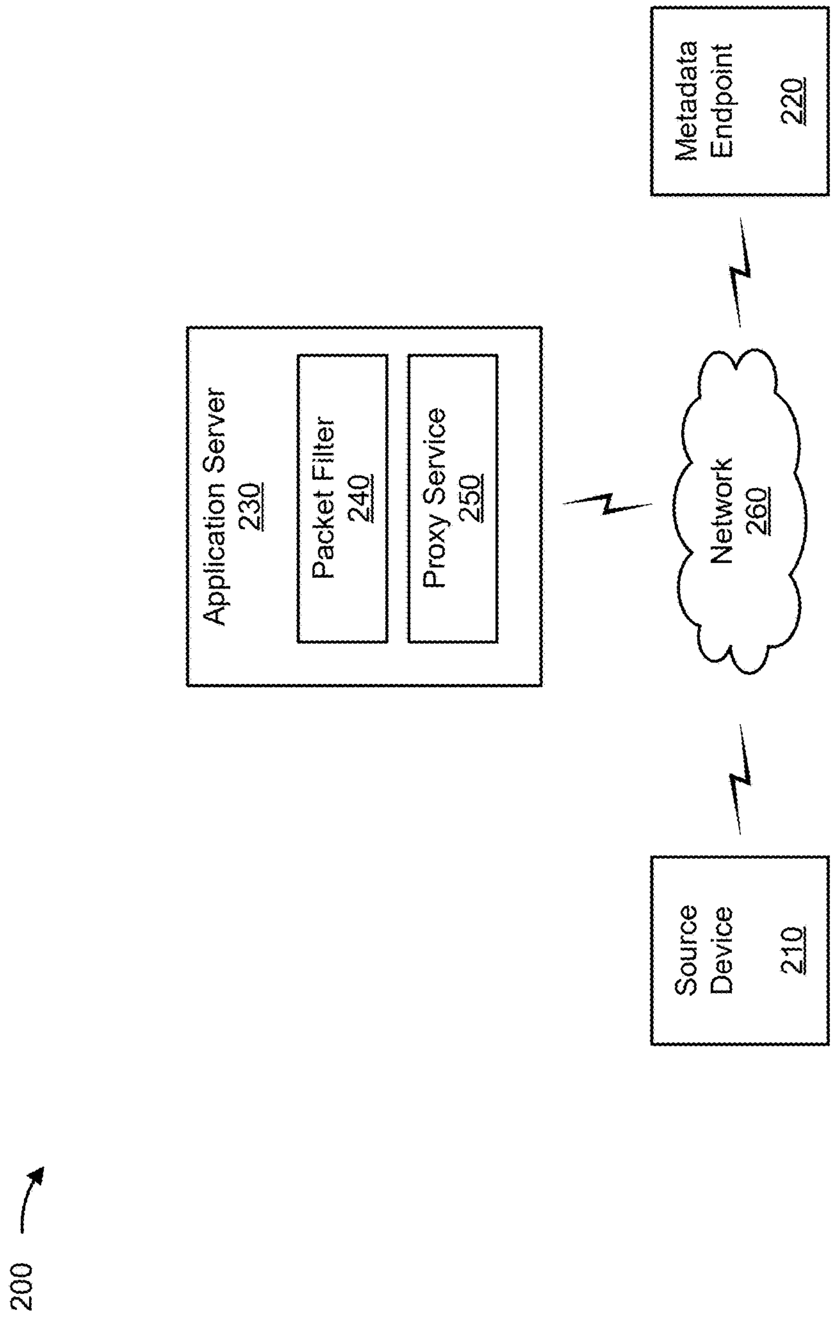
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a source device 210, a metadata endpoint 220, an application server 230, which may include a packet filter 240 and/or a proxy service 250, and a network 260. Devices of environment 200 may interconnect via wired connections, wireless connections, or a combination of wired and wireless connections.

The source device 210 may include one or more devices capable of receiving, generating, storing, processing, and/or providing information associated with accessing metadata, as described elsewhere herein. The source device 210 may include a communication device and/or a computing device. For example, the source device 210 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. In some implementations, the source device 210 may correspond to the source device 102 described with regard to FIGS. 1A-1C.

The metadata endpoint 220 may include one or more devices capable of receiving, generating, storing, processing, providing, and/or routing information associated with providing metadata, as described elsewhere herein. The metadata endpoint 220 may include a communication device and/or a computing device. For example, the metadata endpoint 220 may include a server, such as an application server, a client server, a web server, a database server, a host server, a proxy server, a virtual server (e.g., executing on computing hardware), or a server in a cloud computing system. In some implementations, the metadata endpoint 220 may include computing hardware used in a cloud computing environment. In some implementations, the metadata endpoint 220 may correspond to the metadata endpoint 104 described with regard to FIGS. 1A-1C.

The application server 230 may include one or more devices capable of receiving, generating, storing, processing, providing, and/or routing information associated with a metadata request, as described elsewhere herein. The application server 230 may include a communication device and/or a computing device. For example, the application server 230 may include a server, such as an application server, a client server, a web server, a database server, a host server, a proxy server, a virtual server (e.g., executing on computing hardware), or a server in a cloud computing system. In some implementations, the application server 230 may include a packet filter 240, which may include a component to evaluate packets, identify whether packets convey metadata requests, and determine a type of the metadata requests. In some implementations, the application server 230 may include a proxy service 250, which may include a component to generate a metadata request, obtain metadata using a generated metadata request, and generate a metadata response. In some implementations, the application server 230 may include computing hardware used in a cloud computing environment. In some implementations, the application server 230 may correspond to the application server 106 described with regard to FIGS. 1A-1C.

The network 260 may include one or more wired and/or wireless networks. For example, the network 260 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 260 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
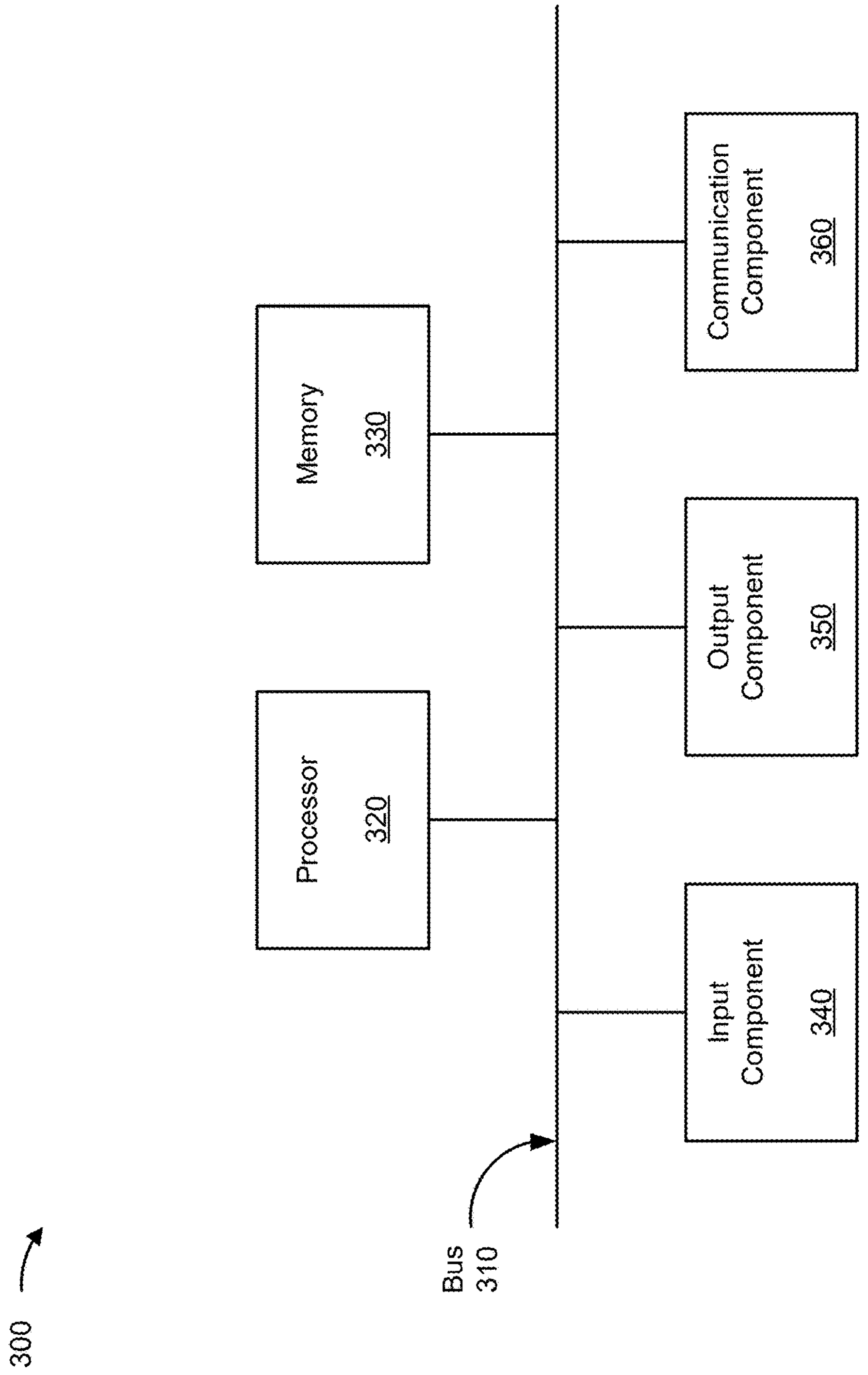
FIG. 3 is a diagram of example components of a device associated with an interface for secure cloud metadata retrieval, in accordance with some embodiments of the present disclosure.

FIG. 3 is a diagram of example components of a device 300 associated with an interface for secure cloud metadata retrieval. The device 300 may correspond to source device 210, metadata endpoint 220, and/or application server 230 (e.g., packet filter 240 or proxy service 250). In some implementations, source device 210, metadata endpoint 220, and/or application server 230 (e.g., packet filter 240 or proxy service 250) may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
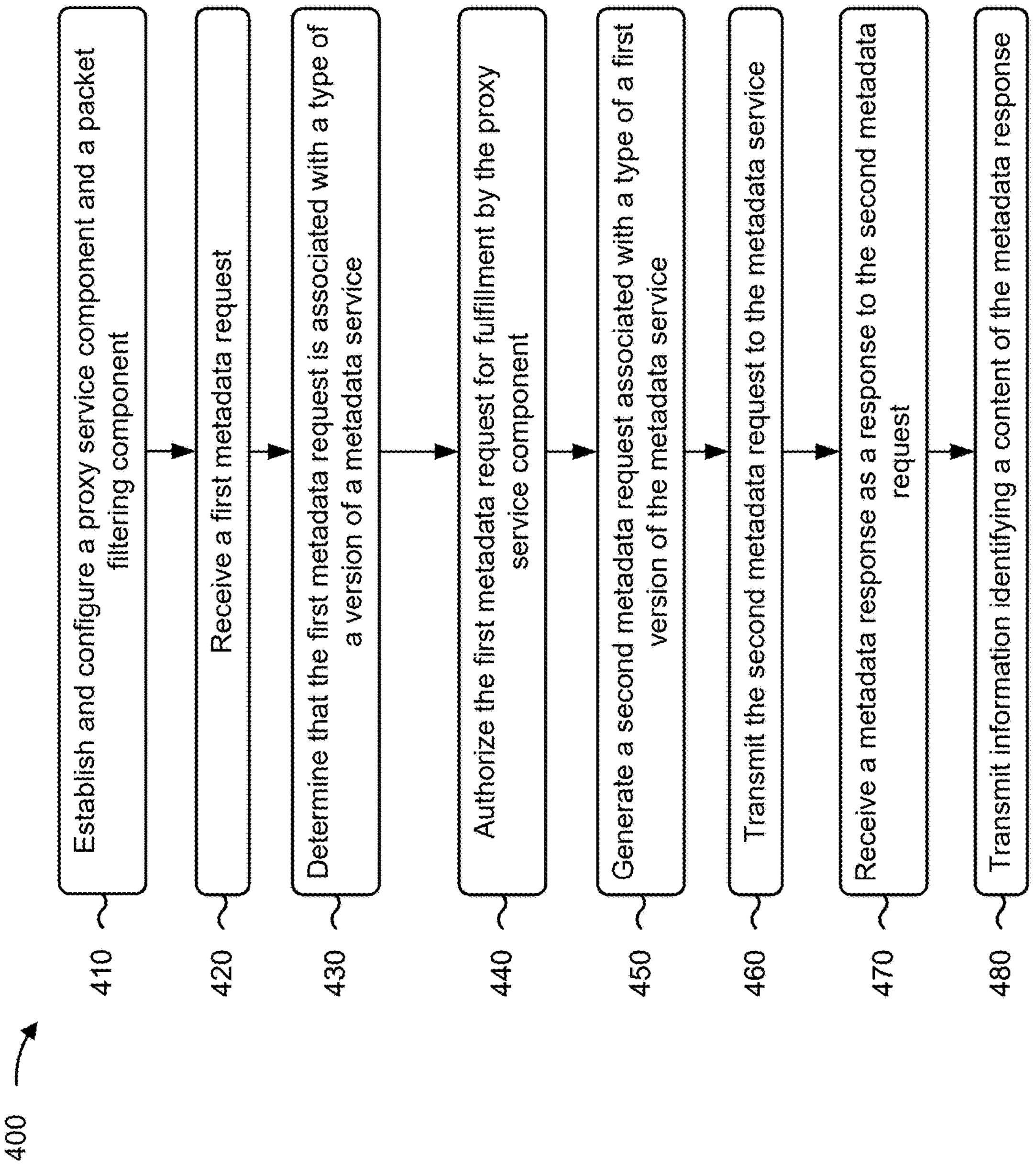
FIG. 4 is a flowchart of an example process associated with providing an interface for secure cloud metadata retrieval, in accordance with some embodiments of the present disclosure.

FIG. 4 is a flowchart of an example process 400 associated with providing an interface for secure cloud metadata retrieval. In some implementations, one or more process blocks of FIG. 4 may be performed by the application server 230. In some implementations, one or more process blocks of FIG. 4 may be performed by another device or a group of devices separate from or including the application server 230, such as the packet filter 240 of the application server 230, the proxy service 250 of the application server 230, the source device 210, and/or the metadata endpoint 220. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include establishing and configuring a proxy service component and a packet filtering component (block 410). For example, the application server 230 (e.g., using processor 320 and/or memory 330) may establish a proxy service component associated with a metadata source associated with a first version of a metadata service and having a first type of metadata requests, as described above in connection with FIG. 1A. Additionally, or alternatively, the application server 230 may configure a packet filtering component associated with redirection of metadata service traffic directed to the metadata service associated with a second type of a second version of the metadata service, as described above in connection with FIG. 1A. As an example, the application server 230 may configure one or more settings to cause the packet filter to identify incoming metadata requests that are associated with IMDSv1 and/or are directed to a metadata endpoint. Additionally, or alternatively, the application server 230 may configure the proxy service 250 to perform authentication and proxy metadata request generation.

As further shown in FIG. 4, process 400 may include receiving a first metadata request (block 420). For example, the application server 230 (e.g., using processor 320, memory 330, input component 340, and/or communication component 360) may receive, from a request source, a first metadata request directed to an endpoint associated with the first version of the metadata service, as described above in connection with reference number 150 of FIG. 1A. As an example, the application server 230 may receive an IMDSv1 type of metadata request that is from a source device and directed to a metadata endpoint.

As further shown in FIG. 4, process 400 may include determining that the first metadata request is associated with a type of a version of a metadata service (block 430). For example, the application server 230 (e.g., using processor 320 and/or memory 330) may determine, using the packet filtering component, that the first metadata request is associated with the second type of the second version of the metadata service, as described above in connection with reference number 152 of FIG. 1A. As an example, the application server 230 may determine that the metadata request is an IMDSv1 type of metadata request directed to a metadata endpoint that supports IMDSv2 type metadata requests.

As further shown in FIG. 4, process 400 may include authorizing the first metadata request for fulfillment by the proxy service component (block 440). For example, the application server 230 (e.g., using processor 320 and/or memory 330) may authorize the first metadata request for fulfillment by the proxy service component, as described above in connection with reference number 156 of FIG. 1B. As an example, the application server 230 may pass the IMDSv1 metadata request from the packet filtering component to the proxy service component and may determine that the IMDSv1 metadata request satisfies one or more authentication criteria for fulfilling the IMDSv1 metadata request.

As further shown in FIG. 4, process 400 may include generating a second metadata request associated with a type of a version of the metadata service (block 450). For example, the application server 230 (e.g., using processor 320 and/or memory 330) may generate, using the proxy service component, a second metadata request associated with the first type of the first version of the metadata service based on authorizing the first metadata request for fulfillment, as described above in connection with reference number 158 of FIG. 1B. As an example, the application server 230 may generate a new metadata request, in the IMDSv2 format, with information from the IMDSv1 metadata request based on authorizing proxy fulfillment of the IMDSv1 metadata request.

As further shown in FIG. 4, process 400 may include transmitting the second metadata request to the metadata service (block 460). For example, the application server 230 (e.g., using processor 320, memory 330, and/or communication component 360) may transmit the second metadata request to the metadata service, as described above in connection with reference number 158 of FIG. 1B. As an example, the application server 230 may pass the proxy generated IMDSv2 metadata request to a metadata endpoint.

As further shown in FIG. 4, process 400 may include receiving a metadata response as a response to the second metadata request (block 470). For example, the application server 230 (e.g., using processor 320, memory 330, input component 340, and/or communication component 360) may receive a metadata response as a response to the second metadata request, as described above in connection with reference number 160 of FIG. 1B. As an example, the application server 230 may receive, from the metadata endpoint, an IMDSv2 metadata response to the proxy generated IMDSv2 metadata request.

As further shown in FIG. 4, process 400 may include transmitting information identifying a content of the metadata response to the request source as a response to the first metadata request (block 480). For example, the application server 230 (e.g., using processor 320, memory 330, and/or communication component 360) may transmit information identifying a content of the metadata response to the request source as a response to the first metadata request, as described above in connection with reference number 164 of FIG. 1C. As an example, the application server 230 may generate a new IMDSv1 metadata response using information from the received IMDSv2 metadata response and may transmit the new IMDSv1 metadata response to a source device for the IMDSv1 metadata request to fulfill the IMDSv1 metadata request.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1C. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for secure cloud metadata retrieval, the system comprising:
- one or more memories; and
- one or more processors, communicatively coupled to the one or more memories, configured to:
  - establish, on an application server, a proxy service associated with a proxy user;
  - configure, on the application server, a packet filter rule associated with redirection of metadata service traffic, associated with a metadata service, originating from a source other than the proxy service;
  - receive, at the application server, a metadata request for metadata from the metadata service, wherein the metadata request is associated with a set of attribute values and a uniform resource identifier (URI);
  - evaluate, via the proxy service, the set of attribute values and the URI of the metadata request to determine whether to authorize the metadata request;
  - extract, from the metadata request, request information associated with identifying the metadata that is responsive to the metadata request;
  - obtain, from the metadata service and using a set of credentials associated with the proxy service, the metadata that is responsive to the metadata request; and
  - transmit a metadata response message conveying the metadata that is responsive to the metadata request.

2. The system of claim 1, wherein the packet filter rule is an IPTable packet filter rule.

3. The system of claim 1, wherein the one or more processors are further configured to:
- format the metadata, for the metadata response message, according to a message format associated with a particular source of the metadata request.

4. The system of claim 1, wherein the metadata service is associated with instance metadata service (IMDS) version 2 and the metadata request is associated with IMDS version 1.

5. The system of claim 4, wherein the proxy service is instantiated as an interface between one or more IMDS version 2 components and one or more IMDS version 1 components, such that the packet filter rule filters packets transmitted between the one or more IMDS version 2 components and the one or more IMDS version 1 components.

6. The system of claim 1, wherein the one or more processors are further configured to:

authorize the metadata request based on the set of attributes and the URI.

7. The system of claim 6, wherein the one or more processors, to authorize the metadata request, are configured to:

evaluate a user agent associated with the metadata request and a set of credential requests to determine whether to authorize the metadata request.

8. The system of claim 6, wherein the one or more processors, to authorize the metadata request, are configured to:

authorize the metadata request based on a presence of a credential request.

9. A method for metadata interfacing, comprising:

establishing, by an application server, a proxy service component associated with a metadata source associated with a first version of a metadata service and having a first type of metadata requests;

configuring, by the application server, a packet filtering component associated with redirection of metadata service traffic directed to the metadata service associated with a second type of a second version of the metadata service;

receiving, by the application server and from a request source, a first metadata request directed to an endpoint associated with the first version of the metadata service;

determining, by the application server and using the packet filtering component, that the first metadata request is associated with the second type of the second version of the metadata service;

passing, by the application server, the first metadata request from the packet filtering component to the proxy service component;

authorizing, by the application server, the first metadata request for fulfillment by the proxy service component;

generating, by the application server and using the proxy service component, a second metadata request associated with the first type of the first version of the metadata service based on authorizing the first metadata request for fulfillment;

transmitting, by the application server, the second metadata request to the metadata service;

receiving, by the application server, a metadata response as a response to the second metadata request; and transmitting, by the application server, information identifying a content of the metadata response to the request source as a response to the first metadata request.

10. The method of claim 9, further comprising:

formatting the metadata response according to a message format associated with the second type of the second version of the metadata service.

11. The method of claim 9, wherein authorizing the first metadata request comprises:

determining that the first metadata request is not a credential fetching request; and authorizing the first metadata request based on determining that the first metadata request is not a credential fetching request.

12. The method of claim 9, wherein authorizing the first metadata request comprises:

determining whether the first metadata request is associated with a valid user agent; and authorizing the first metadata request based on determining that the first metadata request is associated with a valid user agent.

13. The method of claim 9, wherein authorizing the first metadata request comprises:

identifying a set of attributes associated with the first metadata request;

categorizing the first metadata request based on the set of attributes; and authorizing the first metadata request based on categorizing the first metadata request.

14. The method of claim 13, wherein the set of attributes includes at least one of:

a metadata string attribute, a time attribute, a user identity attribute, a request source attribute, or an endpoint attribute.

15. The method of claim 13, wherein the set of attributes is evaluated using a configured authorization logic.

16. A non-transitory computer-readable medium storing a set of instructions, the set of instructions comprising:

one or more instructions that, when executed by one or more processors of a system, cause the system to:

establish a proxy service associated with a proxy user;

configure a packet filter rule associated with redirection of metadata service traffic, associated with a metadata service, originating from a source other than the proxy service;

receive a metadata request for metadata from the metadata service;

evaluate the metadata request to determine whether to authorize the metadata request;

extract request information associated with identifying the metadata that is responsive to the metadata request based on authorizing the metadata request;

obtain the metadata that is responsive to the metadata request; and transmit a metadata response message conveying the metadata that is responsive to the metadata request.

17. The non-transitory computer-readable medium of claim 16, wherein the one or more instructions further cause the system to:

format the metadata, for the metadata response message, according to a message format associated with a particular source of the metadata request.

18. The non-transitory computer-readable medium of claim 16, wherein the metadata service is associated with instance metadata service (IMDS) version 2 and the metadata request is associated with IMDS version 1.

19. The non-transitory computer-readable medium of claim 16, wherein the proxy service is instantiated as an interface between one or more IMDS version 2 components and one or more IMDS version 1 components, such that the packet filter rule filters packets between the one or more IMDS version 2 components and the one or more IMDS version 1 components.

20. The non-transitory computer-readable medium of claim 16, wherein the one or more instructions further cause the system to:

authorize the metadata request based on a set of attributes of the metadata request.

* * * * *